W S. GREY.
WATER HEATER.
APPLICATION FILED OCT. 3, 1916.
1,264,061.
Patented Apr. 23, 1918.
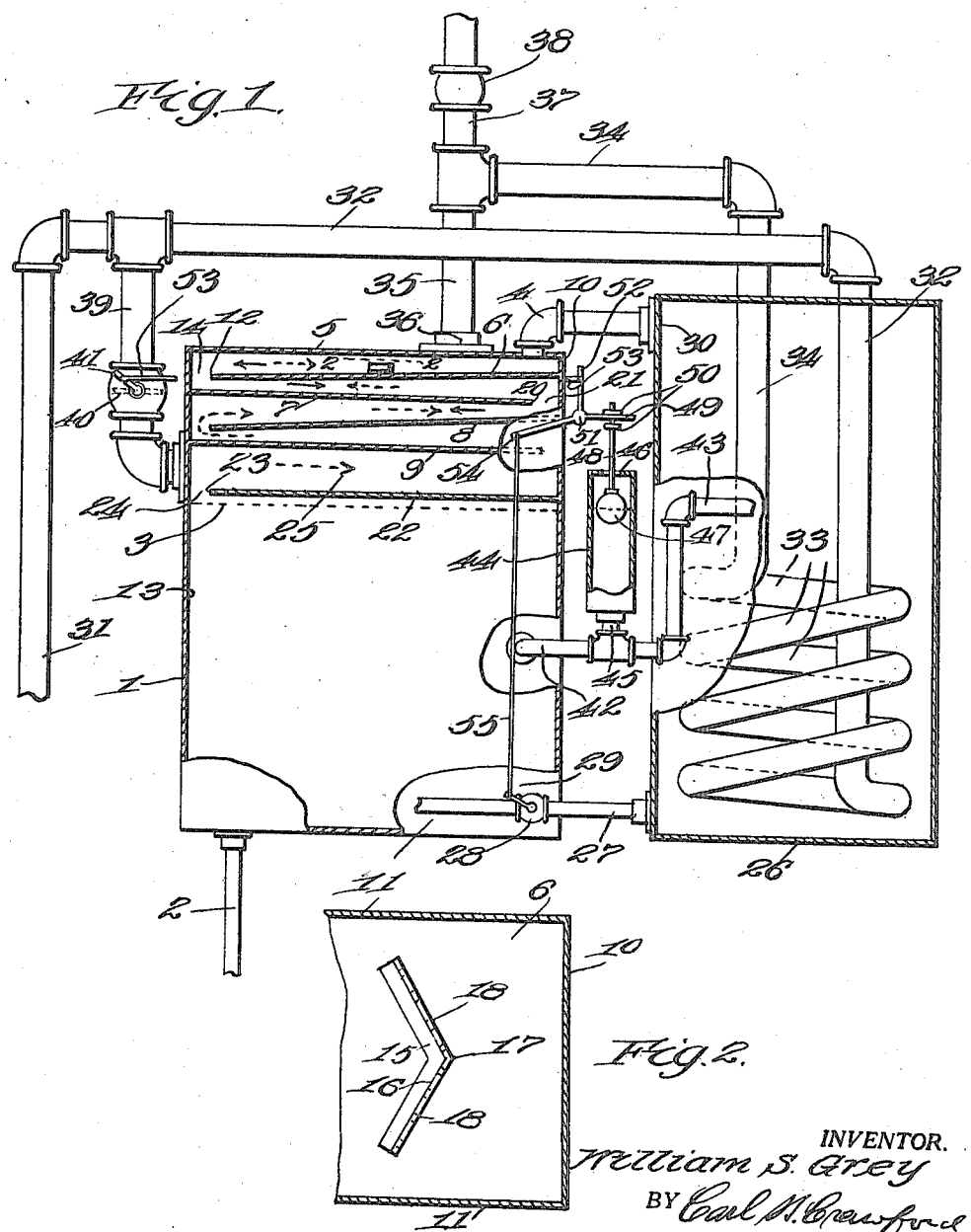

UNITED STATES PATENT OFFICE.

WILLIAM S. GREY, OF SEATTLE, WASHINGTON, ASSIGNOR OF ONE-HALF TO HENRY A. AMMANN, OF SPOKANE, WASHINGTON.

WATER-HEATER.

1,264,061.           Specification of Letters Patent.     Patented Apr. 23, 1918.

Application filed October 3, 1916. Serial No. 123,598.

*To all whom it may concern:*

Be it known that I, WILLIAM S. GREY, a citizen of the United States, residing at Seattle, in the county of King and State of Washington, have invented new and useful Improvements in Water-Heaters, of which the following is a specification.

This invention relates to improvements in water heaters of that class which are more especially designed for utilizing exhaust steam as the heating medium.

The invention is particularly adapted for use in heating wash water for laundries and one of the many objects is to avoid defective systems now in use.

At the present time the hot water tanks of laundries are not only of a very large capacity but the heating medium is applied to the entire volume of water contained in the tank and the water supply admitted to this volume is admitted at a very low temperature, so that every time there is a draw-off of hot water for use in the laundry, the entrance of cold water to supply the deficiency in the tank immediately lowers the temperature of the entire volume in the tank. Now by reason of the fact that it is usual to close down the laundry at least one day in the week, it will be readily apparent that the tank will become entirely cold over Sunday, and Monday morning when the greatest supply of water is demanded, it is usual to find that the exhaust steam cannot heat up the cold volume in the tank, in view of the heavy drain thereupon, until from half to three quarters of a day. This is directly due to the fact that the heating medium is applied to the entire volume of contents of the tank and that all of the water admitted to the tank is admitted cold. Even with the application of live steam, instead of exhaust steam, it would be impossible to quickly heat a tank of a thousand gallon capacity, from a low non-operating temperature up to the necessary working temperature when work is started at the laundry about the time that the boilers are started.

A further defect of the systems now in use is the inability to supply wash-water at a uniform temperature. Owing to the fact that the hottest water in the tank is at the upper portion thereof, and in view of the fluctuations of level, it is necessary to draw-off from the lower portion of the tank to supply the laundry, the temperature of the water actually delivered to the laundry is always different and not up to the required temperature.

Now in accordance with my invention, I provide a constant body of draw-off water which is maintained practically constant in volume, the volume being preferably considerably greater than the drawoff by the laundry at the maximum. When water is drawn off from this body of constant or practically constant volume, the water added to make up for the drawoff is not directly supplied to this drawoff body of water in a cold state but is heated even to a higher temperature than the drawoff body of water, before it reaches the same, and therefore the inflow never cools the drawoff body but on the contrary, serves to increase or maintain the temperature thereof.

In my improved heater, exhaust steam is directly applied to the incoming supply to the drawoff tank, and a special feature of the invention consists in providing means whereby the level in the drawoff tank automatically controls admission of the heating medium and also of the water supply.

My invention also includes the feature of supplying water to the drawoff tank from a supply tank and utilizing exhaust steam for bringing up the temperature of the supply tank prior to delivery of the water therefrom to the drawoff tank, and in this connection, it is a feature of my invention to directly heat the supply of water to the draw off tank, and provide novel means with apparatus for controlling supply to the supply tank simultaneously with the control of delivery of exhaust steam for the drawoff tank. In accordance with this arrangement, I am enabled to maintain a volume of water in the supply tank, always subject to the heat of the exhaust steam, so that I can maintain the temperature in the supply tank relatively high irrespective of the periodical feed from the supply tank to the drawoff tank.

It is of great importance to provide an instantaneous and very prompt delivery of exhaust steam to the incoming water of the drawoff tank and it is also desirable to utilize practically the total volume of exhaust steam for this initial heating purpose inasmuch as the periods of drawoff are seldom of a prolonged nature. During the periods wherein the drawoff tank is being supplied, it is not essential to have a maximum flow of exhaust steam through the supply tank, and in order to simplify this control of exhaust steam flow, I provide a minimum friction resistance connection for flow of the exhaust steam to the drawoff tank, and a maximum resistance connection for flow of exhaust steam to the supply tank. Thus when the minimum resistance connection is opened, the exhaust steam will take the path of least resistance and substantially all of this exhaust steam will flow into the drawoff tank, this feature of my invention not only residing in the construction and arrangement of the exhaust steam piping, but also residing in a single valve control for the minimum friction connection with a normally free and unrestricted passage to the maximum resistance connection.

It is also a feature of my invention to provide a closed drawoff tank, and a closed supply tank, with the level in the draw off tank below the top thereof so that when exhaust steam delivery to the top of the drawoff tank is shut off and condenses, a partial vacuum will be created such as will reduce back pressure on the engine and will also serve to induce a flow of exhaust steam through the minimum friction connection of the drawoff tank thereby adding to the efficiency and novelty of the minimum and maximum friction connections. A still further feature of the invention consists in providing a condensation connection from that portion of the piping leaving the supply tank, for delivery of condensation to the drawoff tank, this connection having a non-return valve delivery to atmosphere whereby the entire exhaust steam piping will be under control, in its operation, by a single valve in the minimum resistance connection with the drawoff tank.

My invention has many other features of novelty and advantages of importance which will be more fully described in connection with the accompanying drawing and which will be more particularly pointed out in and by the appended claims.

In the drawing:—

Figure 1 is a vertical sectional view of a water heater involving the most improved form of my invention with certain parts shown in elevation.

Fig. 2 is a sectional view on line 2—2 of Fig. 1.

Like characters of reference designate similar parts throughout the different figures of the drawings.

As illustrated, 1 designates what I will hereinafter term a drawoff tank in which is stored a normally constant volume of hot water which will be continually maintained at a temperature of approximately 170 degrees, because of the frequent draw-off which are invariably necessitated by operation of a laundry. A drawoff pipe 2 leads from a lower portion of said drawoff tank for delivery of hot water to the various machines in the laundry. A dotted line 3 indicates the maximum and practically constant level of the hot water in the drawoff tank and above this level, the interior of the tank is free from contents although the tank is closed to atmosphere. A water inlet or inflow to the drawoff tank is indicated at 4, and the same opens to the drawoff tank through the top 5 thereof.

I provide novel means in the upper portion of the drawoff tank for prolonging the flow of the incoming water and also causing the incoming water to take a circuitous course from the time it leaves the intake 4, or enters the tank 1, to the time it is actually delivered to the constant volume of which the level is indicated at 3.

As shown, the said prolonging means consists of a plurality of plates 6, 7, 8 and 9, disposed in superimposed relation above the normal water level 3. The uppermost of said plates, indicated at 6, is secured to one end wall 10, of the tank 1, and to the sides 11 thereof throughout its length, the end 12 terminating short of the opposite end wall 13 to provide a space 14 for discharge of the water down onto plate 7. The plate 6 is inclined downwardly toward its delivery end to provide for a gentle flow of the water therealong. In order to spread the water so that the latter will flow in an attenuated volume along said plate, and along the remaining plates, I provide spreader means which I will now describe.

As illustrated, the improved spreader means may comprise a strip of angle iron bent upon itself at 16 to form a dividing apex 17 and laterally extending spreader portions 18. If desired, I may provide openings 18 so that a portion of the flow may pass through the spreader. It will be clear that the inflow through pipe 4 would otherwise direct the water substantially centrally of the plate 6 and this would tend to cause a substantially central flow throughout the remaining plates. However, by means of this improved spreader I am able not only to thin the volume of flow along the uppermost but also along the successively lowermost flow plates.

The next adjacent plate 7 is secured to end wall 13 and side walls 11 up to its terminal end 20 which is sufficiently short of end wall 10 to provide a discharge space for flow of the water down onto plate 8. Plates 8 and 9 are oppositely inclined and discharge at alternate ends and the course of the water throughout its circuitous path is indicated by the arrows in full lines. The foregoing constitutes means for prolonging the path of flow of the incoming water to the drawoff tank.

Below the lowermost plate 9 and above the maximum water level 3 is a partition plate 22 which is connected with end wall 10 and side walls 11 throughout its length, the end 23 terminating short of wall 13 and adjacent the steam intake, which will be later described, to provide for a discharge space 24 into the constantly stored volume of hot water in tank 1. The space between partition plate 22, and plate 9, forms a steam ingress passage 25 for the steam entering the prolonging means in the direction indicated by the dotted arrows.

I prefer to employ an auxiliary or supply tank which is arranged for supplying water to the drawoff tank. By means of this construction, I am able to not only store but previously maintain at a relatively high temperature, a considerable volume of water in the supply tank for delivery to the drawoff tank.

As illustrated, the supply tank is indicated at 26 and the same is provided with a pipe 27 opening into its lower end, pipe 27 being connected with a source of supply of water. A valve 28, preferably of the Foster type, is interposed in pipe 27 and is provided with an operating lever 29. Supply tank 26 is preferably slightly higher than drawoff tank 1 and supply pipe 4 opens to tank 26 at 30 so that when the water level in tank 26 reaches supply pipe 4, delivery to tank 1 will be effected.

I will next describe the manner in which steam, preferably exhaust steam is applied as a heating medium both to the draw-off and to the supply tank.

Pipe 31 leads from connection with the exhaust of the laundry engine and is provided with a limb 32 which extends over the tank 1 and down into supply tank 26. An intermediate portion of limb 32 is coiled, as indicated at 33, in supply tank 26, and the remaining limb 34 extends up out of the tank and is provided with a condensation connection 35 which delivers to the flow prolonging means of the draw-off tank 1, at 36, thereby saving, as much as possible, all of the water. The limb 34 has an extension or terminal 37 which delivers to atmosphere and the said terminal 37 is provided with a non-return valve 38 which closes under atmospheric pressure to prevent entrance of air into tank 1.

In advance of the intermediate portion or loop 33, with respect to the direction of flow of the exhaust steam, I provide a connection 39 which delivers from limb 32 to space 25, as clearly shown in Fig. 1. A butterfly valve 40 is interposed in connection 39 and is provided with an operating lever 41.

By reason of the fact that the path of steam through coil 33 is longer than the path of the steam through connection 39, the frictional resistance in connection 39 will be very much less than in coil 33, and therefore I will term connection 39 a minimum friction connection and loop 33 a maximum friction connection. Maximum friction connection is normally free, in fact at all times free, for passage of steam therethrough whereas minimum friction connection 39 will be controlled by butterfly valve 40. It will be clear that when butterfly valve 40 is closed, the exhaust steam will be forced to flow through loop 33. When valve 40 is open, the steam will take the path of least resistance and flow into tank 1. However, the periods of draw-off are shorter than the intervals therebetween and therefore steam will always flow through coil 33 except during these short periods. Water of condensation will collect in the lower convolutions of the coil 33 but this will only offer about one pound and a half back pressure to the engine. This is no more than the back pressure that would be offered if steam were discharged under the surface of water, which is frequently done, and which back pressure is considered almost nugatory. Thus while back pressure on the engine is not wholly and entirely eliminated, it is reduced to a minimum, and because of the fact that a vacuum will be created in the baffles by condensation of the steam, a suction will assist in drawing the water into the baffle chamber from coil 33 therefore back pressure will not even equal the back pressure of exhaust discharge below the surface of a body of water.

I will next describe the novel means whereby inflow of steam and water to tank 1 is automatically controlled, preferably by the level in tank 1.

An overflow pipe 42 leads from tank 1 at a point below the constant level 3 thereof and extends upwardly as indicated at 43 to limit the elevation of overflow. The part 43, of pipe 42 will not permit overflow unless the level in tank 1 seeks to rise above dotted line 3. A float chamber 44 is connected with pipe 42 at 45 and extends upwardly to a point above the normal water level 3, and is provided with an opening 46 in its top. A float 47 is disposed in said chamber and is provided with a stem 48. Stem 48 extends through an operating arm 49, of an operating lever, and is provided with abutments 50. Said operating lever is pivoted at 51, to rotate about a fixed axis, and is provided with an arm 52. Arm 52 is connected by link 53 with operating lever 41 of butterfly valve 40. The remaining arm 54 of said lever, is connected by link 55 with lever 29, of valve 28.

Assuming that the parts are in the position shown in Fig. 1, and that a supply of hot water is being, or is about to be drawn off through pipe 2, then the level 3 will slightly descend in tank 1 and likewise the float 47 will descend. Abutment 50 will actuate the three-armed lever to open valves 28 and 40. This will permit of delivery of cold water to tank 26 which latter will instantly overflow onto plate 6. Steam will be admitted to tank 1 through minimum resistance connection 39 and will flow against the water delivered downwardly by the plates 6 to 9. By the time the incoming water reaches space 24 where it is delivered to the main storage water body of tank 1, this incoming water will have been heated to a temperature considerably above the stored water in tank 1 and will not only fill the same up to its constant level but will also heat the same up to its normal temperature. Inflow of water and steam will continue as long as water is being drawn off from tank 1 and until the level in tank 1 again reaches dotted line 3. Attention is directed to the fact that if the draw-off from tank 1 should possibly exceed the inflow, which would not be probable with the arrangement shown, still the inflow after the draw-off was shut off, would be heated until the water level in tank 1 had risen to dotted line 3 then both the steam and water would be simultaneously shut off by float 47.

It will be noted that after steam has been shut off against ingress to tank 1, the space above water level 3 would permit the steam to condense and form a partial vacuum in the upper portion of tank 1. This would energize valve 38 to close the same against the admission of air to tank 1 and immediately after condensation took place in tank 1 there would be a sufficient vacuum to draw in steam through connection 39 when the valve 40 was next opened. This would serve to relieve back pressure on the engine.

Inasmuch as the steam passing through coil 33 will normally be practically entirely condensed by the time it has reached limb 34, there will hardly be any discharge of steam into tank 1 through condensation connection 35. However, after the steam in tank 1 has condensed, there will be suction through connection 35 to draw the condensation onto plate 6.

It will now be clear that valve 40, because of the maximum and minimum resistant connections, is singly and alone capable of controlling passage through said connections.

If a long period of time should intervene between draw-offs from tank 1, any steam which was not condensed in its passage through coil 33, because of the high temperature of the supply water, could readily pass out to atmosphere through terminal 37. It will be very clear that practically all of the exhaust steam is utilized for heating purposes and it is immaterial how high the temperature becomes in tank 26 since there is always an outlet to atmosphere.

The only openings to atmosphere are through 37, 46 and 43 and therefore all the condensation can be entirely saved and all the heat conserved. This may even apply to trapping the water to the storage tank from other machine entities of the laundry.

During the time that water is not being drawn off from tank 1, the exhaust steam is raising the temperature in supply tank 26, and inasmuch as the hottest water will be at the top of said tank, it will be seen that only the hottest water in tank 26 will flow into tank 1.

In starting the laundry, with all parts entirely cold, it would merely be necessary to draw-off the contents of tank 1 in order to fill the same with hot water. And it will be further clear that because of the fact that I heat the water before it reaches water level 3, and also by reason of the fact that I heat the water in tank 26, I am thereby able to provide a draw-off tank of considerably reduced capacity with respect to the old form of tanks now in use, and in addition, I can always maintain an ample supply of hot water.

It is believed that the novelty and advantages of my invention will be fully understood from the foregoing description, and while I have herein shown and described one specific form of my invention, I do not wish to be limited thereto except for such limitations as the claims may import.

I claim:

1. In a water heater, a draw-off tank for the water to be heated, a supply tank delivering to said draw-off tank and having a water supply intake, a source of supply of steam for heating the draw-off water, and means controlled by the water level in said draw-off tank for controlling the water intake to said supply tank and admission of steam to heat said draw-off water, substantially as described.

2. In a water heater, a draw-off tank, a supply tank delivering to and forming a sole water supply for said draw-off tank, a source of supply of steam for heating the water as it enters said draw-off tank, and means actuated by the water level in said draw-off tank for initiating delivery of water from said supply tank to said draw-off tank and opening the steam supply to said draw-off tank to heat the water as it enters said draw-off tank, substantially as described.

3. In a water heater, a draw-off tank for the water to be heated, a supply tank delivering to said draw-off tank and having a water supply intake, a source of supply of steam for heating the draw-off water as it is entering said draw-off tank, and automatically acting means for opening delivery of steam and said supply water to said draw-off tank to heat the supply water as it enters said draw-off tank, substantially as described.

4. In a water heater, a draw-off tank having a steam supply pipe and a water supply pipe and means controlled by the water level in said draw-off tank for simultaneously controlling delivery of water and steam to said draw-off tank, substantially as described.

5. In a water heater, a draw-off tank, a storage tank for delivery of water to said draw-off tank, said storage tank having a water supply intake, a source of supply of steam delivering to said draw-off tank to heat the water therein and having unrestricted coil passage through said supply tank to heat the water therein irrespective of steam delivery to said draw-off tank, and means controlled by the water level in said draw-off tank for controlling steam delivery thereto and also controlling water delivery to said supply tank, substantially as described.

6. In a water heater, a draw-off tank, a supply tank discharging into said draw-off tank and provided with a water intake, piping connected with a source of supply of steam and having a minimum resistance connection with said draw-off tank to heat the water therein and a maximum resistance connection for the steam through said supply tank to heat the water therein, the said maximum resistance path being constantly open for the flow of steam, and means controlled by the water level in said draw-off tank for regulating the water intake to said supply tank and thereby controlling water supply to said draw-off tank and also controlling delivery of steam through said minimum resistance connection to said draw-off tank, substantially as described.

7. In a water heater, a draw-off tank, a supply tank delivering to said draw-off tank and having a water intake pipe, a pipe connection for delivery of steam to said draw-off tank provided with a coil passage for the steam through said supply tank and a remote condensation connection with said draw-off tank, and automatic means controlled by the level in said draw-off tank for controlling steam and water supply to said draw-off tank, substantially as described.

8. In a water heater, a draw-off tank, a supply tank delivering to said draw-off tank and provided with a water intake, piping for connection with a source of supply of exhaust steam provided with a loop or coil portion extending into and out of said supply tank, the discharge end of said coil having a condensation delivery connection to said draw-off tank, a branch connection in advance of said coil with respect to the flow of the steam for delivery to said draw-off tank, and means controlled by the level in said draw-off tank for controlling delivery of steam thereto and controlling delivery of water from said supply tank to said draw-off tank, substantially as described.

9. In a water heater, a draw-off tank, a supply tank delivering to said drawoff tank, a pipe line connected with a source of supply of exhaust steam and having an intermediate portion extending through said supply tank to heat the water therein and provided with a terminal connection delivering to said draw-off tank following passage of the steam through said supply tank, and a branch connection in advance of said intermediate portion with respect to the flow of the steam for delivery to said draw-off tank, substantially as described.

10. In a water heater, a draw-off tank, a supply tank delivering to said draw-off tank, and a source of steam supply having normally a free and unrestricted passage through said supply tank, whereby the water therein will be normally heated prior to its delivery to the draw-off tank, said steam supply having connection with said draw-off tank to heat the water therein and reduce steam passage through said supply tank by discharge of steam into said draw-off tank, and means for controlling discharge of steam into said draw-off tank, substantially as described.

11. In a water heater, a draw-off tank, a supply tank delivering thereto, a steam pipe having an intermediate coil portion in said supply tank for heating the supply of water the discharge end of said pipe having a condensation connection with the draw-off tank, and a check valve or non-return valve outlet to atmosphere, substantially as described.

12. In a water heater, a draw-off tank, a supply tank delivering to said draw-off tank, a source of supply of steam having free delivery to said supply tank for heating the water in the latter and having valve controlled delivery to said draw-off tank to heat the water as it enters the latter from said supply tank, and means controlling water delivery to said draw-off tank from said supply tank and operating said valve for delivery of the steam to heat the water as it enters said draw-off tank, substantially as described.

13. In a water heater, a draw-off tank, a supply tank delivering to said draw-off tank, a source of supply of steam having a relatively prolonged and free passage path to heat said supply tank and having a short cut valved connection for delivery of steam to said draw-off tank whereby the major portion of the steam will enter said draw-off tank when said valved connection is opened, and automatic means for opening said valved connection and deflecting delivery from said supply tank to said draw-off tank to cause the entering steam to heat the water as it enters said draw-off tank, substantially as described.

In testimony that I claim the foregoing as my own, I hereby affix my signature.

WILLIAM S. GREY.

Copies of this patent may be obtained for five cents each, by addressing the "Commissioner of Patents, Washington, D. C."